Patented May 3, 1949

2,469,045

UNITED STATES PATENT OFFICE 2,469,045

BUBBLE COMPOSITION

Joseph R. La Vietes, Brooklyn, N. Y.

No Drawing. Application May 25, 1946,
Serial No. 672,331

6 Claims. (Cl. 252—307)

The present invention is directed to solutions capable of producing bubbles and more particularly to an improved solution wherein a new and unexpected effect is obtained.

It has been customary for a long time to provide solutions which are made up of ordinary soap dissolved in water and to produce bubbles therefrom by means of a so-called bubble pipe. More recently improved effects have been obtained by substituting for the soap the well-known wetting agents such as the sulphonated oils, higher hydrocarbons, higher alcohols, fatty acids and the like. Such solutions are capable of producing relatively large and resistant bubbles with relatively tough films. Upon the breaking of the bubbles, the material practically disappears.

The present invention is intended to provide an improvement in the above described solutions; it being among the objects of the present invention to produce bubbles which when they burst do not disappear but form into a parachute-like body which settles downwardly relatively slowly.

In practicing the present invention, there is provided a solution of a wetting agent in water as heretofore. However, the solution also contains a predetermined amount of a water-soluble gum. The gum should be present in sufficient amounts to provide film-forming material for the bubbles. It is often advisable to add to the solution a substance which will reduce the surface tension of the bubble to be formed.

A solution of this type may be blown or otherwise formed into bubbles which will float for a substantial length of time, and as the water evaporates from the surface, the bubble does not merely disappear but shrinks slightly, producing a substantially continuous film of the gum, which film being very light practically floats in the air. It settles slowly and gives the effect of a parachute in descent. The dry material is a very fine white powder which disappears on rubbing. It does not stiffen materials which it comes in contact with.

The invention may be illustrated by a number of compositions, given below, which indicates the wide variations which are possible in the application of the principles of the invention.

Example 1

The composition contains the following constituents:

| | Per cent |
|---|---|
| Gum ghatti | 1.50 |
| Sodium alkyl aryl sulphonate | .75 |
| Water | 98.75 |

The gum is introduced into a coarse mesh, cloth bag or placed on a wire screen and suspended in the water. The temperature of the water should be at or near the boiling point and is continuously stirred in order to hasten the solution of the gum in the water. After all of the gum has dissolved, the solution is allowed to cool down to about 50° C. Then the wetting agent is introduced and stirred so as to dissolve the solution.

The film forming properties in gum ghatti are such that in the amounts contained in the solution, it is capable of forming an almost continuous film when the water has evaporated to a point where the gum precipitates out. Therefore, when a bubble is made with the above composition and the aqueous film is disrupted, there is a slight shrinking of the film but it still retains its approximate original shape. For this reason, it does not immediately drop to the ground but floats in the air as well as if it were a fully inflated bubble. When the precipitation of the gum takes place, instead of being a transparent bubble, it becomes a highly colored film. It is strikingly visible and gives a perfect parachute effect.

Example 2

A composition is made having the following constituents:

| | Per cent |
|---|---|
| Gum ghatti | 3.0 |
| Gum arabic | 2.0 |
| Sodium alkyl aryl sulphonate | 2.5 |
| Water | 92.5 |

The mixture is made approximately as set forth in Example 1 by placing the mixture of gums first into the practically boiling water and adding the wetting agent to the solution. By providing a mixture of gums and increasing the amount thereof, a more continuous film is obtained and a better parachute effect results.

Example 3

Another composition adapted for the stated purpose is as follows:

| | Per cent |
|---|---|
| Gum arabic | 9.7 |
| Sodium alkyl aryl sulphonate | 7.0 |
| Gelatin | 0.5 |
| Water | 82.8 |

This composition is made similarly to that of Example 1. The gum arabic is dissolved in the boiling water and after the solution has cooled, the wetting agent and the gelatin are added and dissolved with stirring. The gelatin has the effect of reducing the surface tension of the bubble. The relative proportions of the gelatin and gum are such that reduction of surface tension is not sufficient to materially interfere with the formation of the bubbles. After the evaporation of the water causes the bubble to collapse, the fact that the surface tension was low results in very little, if any, shrinkage of the diameter of the bubble. Therefore, the parachute formed by this composition is of approximately the same size and character as the original bubble.

*Example 4*

A composition is made of the following constituents:

| | Per cent |
|---|---|
| Gum arabic | 2.0 |
| Gum ghatti | 3.0 |
| Sodium alkyl aryl sulphonate | 2.5 |
| Agar agar | 0.5 |
| Water | 92.0 |

The mixture is formed similarly to that of Example 3. In this case, the agar agar is the substance which reduces the surface tension and the mixture of gums provides a sufficiently solid film so that the parachute formed by the collapse of the bubble is substantially continuous in its texture.

The invention is based upon the principle that the gum or mixture of gums is the material which is the base of the parachute effect. The wetting agent has the function of producing the bubbles in cooperation with the water. The gelatin or agar agar, or similar material, has the effect of thickening the solution and thus insuring the formation of the bubbles. They also have the effect of reducing the surface tension of the bubble resulting in a larger parachute matrix.

Although I have described the invention setting forth several specific embodiments thereof, the invention is not limited to the details of said examples. For instance, other water-soluble gums having film forming properties may be substituted for those named, either in whole or in part, provided such gums have sufficient solubility in water to become film-forming either alone or in conjunction with other gums. The relative amounts of gum and water may be changed substantially but it must be made certain that the minimum amount of gum is sufficient to produce the parachute effect, the amount being from 1 to 10% by weight of the solution. Other wetting agents may be adapted for the present purpose. The best wetting agent so far experimented with is of the type wherein the alkyl group of the alkyl aryl sulphonate has from 5 to 12 carbon atoms. Usually the higher alcohols and higher hydrocarbons have twelve or more carbon atoms. Other wetting agents such as condensation products of ethanolamine with fatty acids or mixtures of fatty acids are also suitable for the purpose. In place of the gelatine or agar agar, other non-crystalline materials capable of reducing surface tension may be used in suitable amounts in the water solutions. These and other changes in the details of the operation of the invention may be made within the scope thereof and the invention is to be broadly construed and not to be limited except by the character of the claims appended hereto.

I claim:

1. A composition for producing bubbles consisting essentially of a solution in water of a water-soluble gum capable of forming films, the amount of said gum being from 1.0 to 10.0%, and an alkyl aryl sulphonate soluble in water in an amount from 0.75 to 7.0%, the remainder of the composition being water.

2. A composition for producing bubbles consisting essentially of a solution in water of a water-soluble gum capable of forming films, the amount of said gum being from 1.0 to 10.0%, and an alkyl aryl sulphonate soluble in water in an amount from 0.75 to 7.0% and an amount of gelatin sufficient to thicken the solution less than the amount of said sulphonate, the remainder of the composition being water.

3. A composition for producing bubbles consisting essentially of a solution in water of a water-soluble gum capable of forming films, the amount of said gum being from 1.0 to 10.0%, and an alkyl aryl sulphonate soluble in water in an amount from 0.75 to 7.0%, and 0.5% of gelatin, the remainder of the composition being water.

4. A composition for producing bubbles consisting essentially of a solution in water of gum arabic, the amount of said gum being from 1.0 to 10.0%, and an alkyl aryl sulphonate soluble in water in an amount from 0.75 to 7.0%, the remainder of the composition being water.

5. A composition for producing bubbles consisting essentially of a solution in water of gum ghatti, the amount of said gum being from 1.0 to 10.0%, and an alkyl aryl sulphonate soluble in water in an amount from 0.75 to 7.0%, the remainder of the composition being water.

6. A composition for producing bubbles consisting essentially of a solution in water of a mixture of gum arabic and gum ghatti, the amount of said gum being from 1.0 to 10.0%, and an alkyl aryl sulphonate soluble in water in an amount from 0.75 to 7.0%, the remainder of the composition being water.

JOSEPH R. LA VIETES.

REFERENCES CITED

The following references are of record in the file of this patent:

UNITED STATES PATENTS

| Number | Name | Date |
|---|---|---|
| 1,423,720 | Jennings | July 25, 1922 |
| 1,856,294 | Rice | May 3, 1932 |
| 1,907,982 | King | May 9, 1933 |
| 2,154,231 | Daimler | Apr. 11, 1939 |
| 2,433,625 | Raspet | Dec. 30, 1947 |

OTHER REFERENCES

Bennett: "The Chemical Formulary," 1939, vol. IV, page 504.